United States Patent
Zimmermann

(10) Patent No.: US 7,221,857 B2
(45) Date of Patent: May 22, 2007

(54) SYSTEM AND METHOD FOR EFFICIENTLY PERFORMING A STORAGE MANAGEMENT PROCEDURE

(75) Inventor: Klaus Zimmermann, Loeffingen (DE)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1139 days.

(21) Appl. No.: 10/066,222

(22) Filed: Jan. 31, 2002

(65) Prior Publication Data

US 2003/0147631 A1 Aug. 7, 2003

(51) Int. Cl.
*H04N 7/26* (2006.01)

(52) U.S. Cl. ...................... 386/124; 386/111

(58) Field of Classification Search ............ 386/33, 386/111, 112, 124
See application file for complete search history.

(56) References Cited

U.S. PATENT DOCUMENTS

| | | | |
|---|---|---|---|
| 3,694,581 A * | 9/1972 | Fletcher et al. | 375/240 |
| 5,270,829 A * | 12/1993 | Yang | 386/83 |
| 6,441,754 B1 * | 8/2002 | Wang et al. | 341/50 |
| 6,577,812 B1 * | 6/2003 | Kikuchi et al. | 386/105 |
| 6,768,864 B1 * | 7/2004 | Kimura et al. | 386/111 |

* cited by examiner

*Primary Examiner*—Thai Q. Tran
*Assistant Examiner*—Nigar Chowdhury
(74) *Attorney, Agent, or Firm*—Gregory J. Koerner; Redwood Patent Law

(57) ABSTRACT

A system and method for efficiently performing a storage management procedure may preferably include an audio-video recorder that is configured to receive audio and video data from a data source, and responsively store the received data into a non-volatile storage medium, such as a hard disk drive. A storage manager may preferably be configured to control the storage management procedure by selectively activating a data transcoding procedure that transcodes specified segments of the received data to thereby increase available storage space in the storage medium. The data transcoding procedure may preferably include an immediate mode during which transcoding occurs while data is initially being received by the audio-video recorder. The data transcoding procedure may also preferably include a mediate mode during which transcoding occurs when data is not currently being received by the audio-video recorder.

43 Claims, 8 Drawing Sheets

SYSTEM AND METHOD FOR EFFICIENTLY PERFORMING A STORAGE MANAGEMENT PROCEDURE

BACKGROUND SECTION

1. Field of the Invention

This invention relates generally to techniques for managing electronic information, and relates more particularly to a system and method for efficiently performing a storage management procedure.

2. Description of the Background Art

Implementing effective methods for managing electronic information is a significant consideration for designers and manufacturers of contemporary electronic devices. However, effectively managing information utilized by electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively accesses, stores and manipulates digital image data may benefit from an efficient implementation because of the large amount and complexity of the digital data involved.

Due to growing demands on system resources and substantially increasing data magnitudes, it is apparent that developing new techniques for managing information is a matter of concern for related electronic technologies. Therefore, for all the foregoing reasons, developing effective systems for managing electronic information remains a significant consideration for designers, manufacturers, and users of contemporary electronic devices.

SUMMARY

In accordance with the present invention, a system and method for efficiently performing a storage management procedure are disclosed. In one embodiment, initially, a storage manager from an audio-video (AV) recorder may preferably determine whether occupied storage space in a non-volatile storage medium is greater than a predetermined user-selectable threshold value.

If the storage manager determines that occupied storage space in the storage medium exceeds the specified threshold value, then the storage manager may preferably determine whether a recording of incoming data into the storage medium is currently in progress in the AV recorder. If no recording is currently in progress, then the storage manager may preferably schedule the AV recorder to enter a mediate mode. The AV recorder may then responsively utilize a mediate transcoding system to transcode one or more previously recorded items from the storage medium into a format that requires less storage space when rewritten back into the storage medium.

The storage manager may preferably select stored items for transcoding by utilizing any appropriate techniques. For example, a system user may prioritize the stored information by item type to thereby establish an appropriate order for transcoding. Alternately, stored items may be transcoded in a chronological order in which, for example, the oldest stored items are transcoded first.

However, if a recording of incoming data is currently in progress in the AV recorder, then the storage manager may preferably determine whether to modify current recording parameters for the AV recorder in an immediate mode. The storage manager may preferably determine whether to function in the immediate mode by utilizing a real-time technique or a parallel technique.

For example, the storage manager may reference locally-stored user preferences to obtain user instructions to transcode the incoming data in real time before storing the incoming data into the storage medium. Alternately, the storage manager may reference the user preferences to obtain user instructions to transcode a previously recorded item from the storage medium in parallel with the process of receiving and storing the foregoing incoming data. The present invention thus provides an improved system and method for efficiently performing a storage management procedure.

DETAILED DESCRIPTION

The present invention relates to an improvement in electronic data storage management techniques. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for efficiently performing a storage management procedure, and may include an audio-video recorder that is configured to receive audio and video data from a data source, and responsively store the received data into a non-volatile storage medium, such as a hard disk drive. A storage manager may preferably be configured to control the storage management procedure by selectively activating a data transcoding procedure that transcodes specified segments of the received data to thereby increase available storage space in the storage medium.

The data transcoding procedure may preferably include an immediate mode during which transcoding occurs while data is initially being received by the audio-video recorder.

The data transcoding procedure may also preferably include a mediate mode during which transcoding occurs when data is not currently being received by the audio-video recorder.

Figure 1:
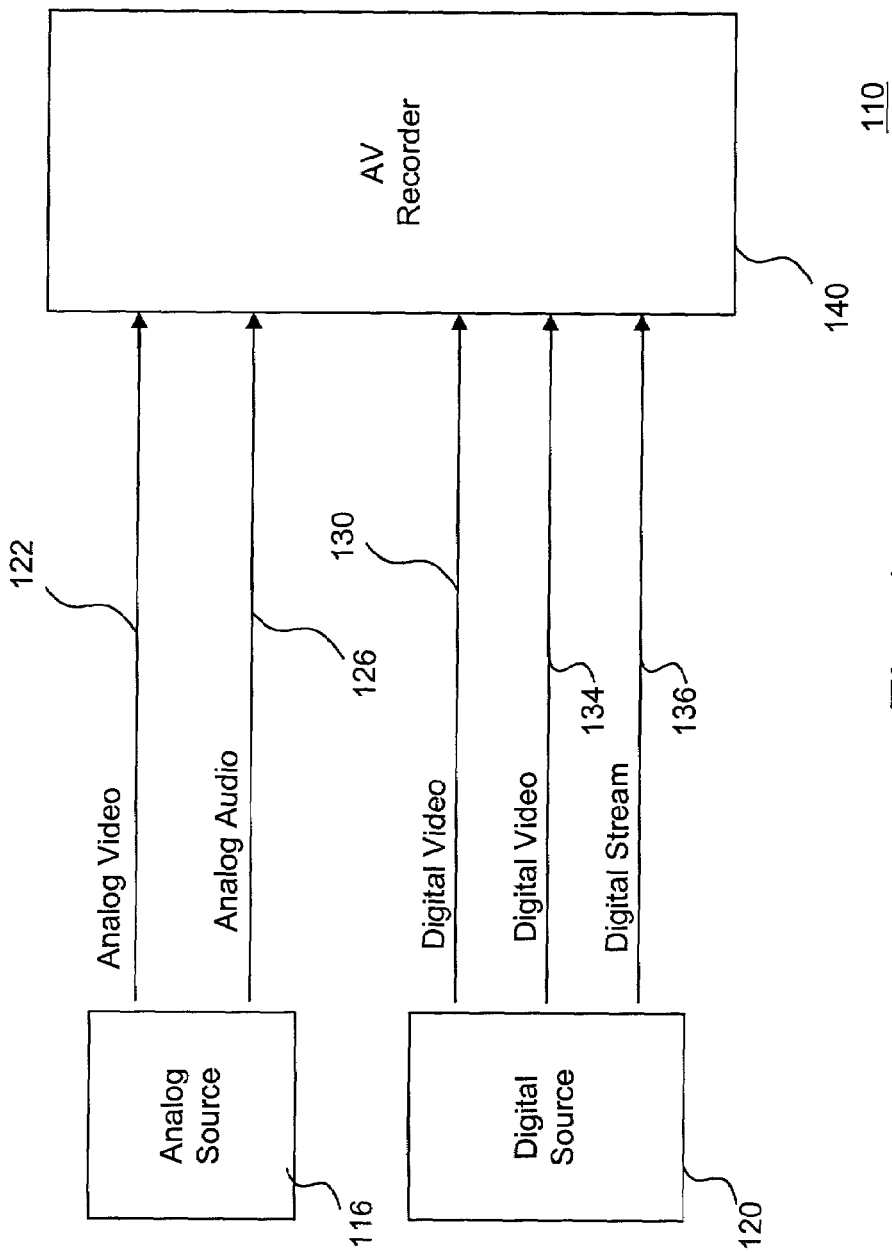
FIG. 1 is a block diagram of an electronic system, in accordance with one embodiment of the present invention.

Referring now to FIG. 1, a block diagram of an electronic system 110 is shown, in accordance with one embodiment of the present invention. In the FIG. 1 embodiment, electronic system 110 may preferably include, but is not limited to, an analog source 116, a digital source 120, and an audio-video (AV) recorder 140. In alternate embodiments, electronic system 110 may readily be implemented using various components and configurations in addition to, or instead of, those discussed in conjunction with the FIG. 1 embodiment. For example, system 110 may also readily include multiple analog sources or multiple digital sources.

In the FIG. 1 embodiment, either analog source 116 or digital source 120 may be implemented as any desired type of electronic entity or system that provides respective types of data to AV recorder 140. For example, either analog source 116 or digital source 120 may be implemented as part of a computer device, a video storage device, one or more video cameras, a compact disc (CD) player, or a video broadcasting transmission system.

In the FIG. 1 embodiment, analog source 116 may preferably transmit an analog video signal to AV recorder 140 via path 122 in accordance with any appropriate analog standard. For example, analog transmitter 116 may transmit a video signal from data source 114 in accordance with a National Television Standards Committee (NTSC) standard. Similarly, analog source 116 may preferably transmit an analog audio signal to AV recorder 140 via path 126 in accordance with any appropriate analog standard.

Furthermore, in the FIG. 1 embodiment, digital source 120 may preferably transmit digital video information to AV recorder 140 via path 130 in accordance with any appropriate standard. Similarly, digital source 120 may preferably transmit digital audio information to AV recorder 140 via path 134 in accordance with any appropriate standard. In certain embodiments, digital source 120 may alternately provide various types of digital video and digital audio to AV recorder 140 as a multiplexed bitstream such as the digital stream on path 136 of the FIG. 1 embodiment. In certain other embodiments, analog source 116 and digital source 120 may alternately transmit other types of information from various other information sources in accordance with any other appropriate format or standard.

In the FIG. 1 embodiment, AV recorder 140 may be alternately implemented as any desired type of electronic entity or system. For example, AV recorder 140 may be alternately implemented as a computer device, a digital versatile disk (DVD) decoder device, a television settop box device, or a video broadcasting receiver device. One exemplary configuration and corresponding functionalities for AV recorder 140 are further discussed below in conjunction with FIG. 2.

Figure 2:
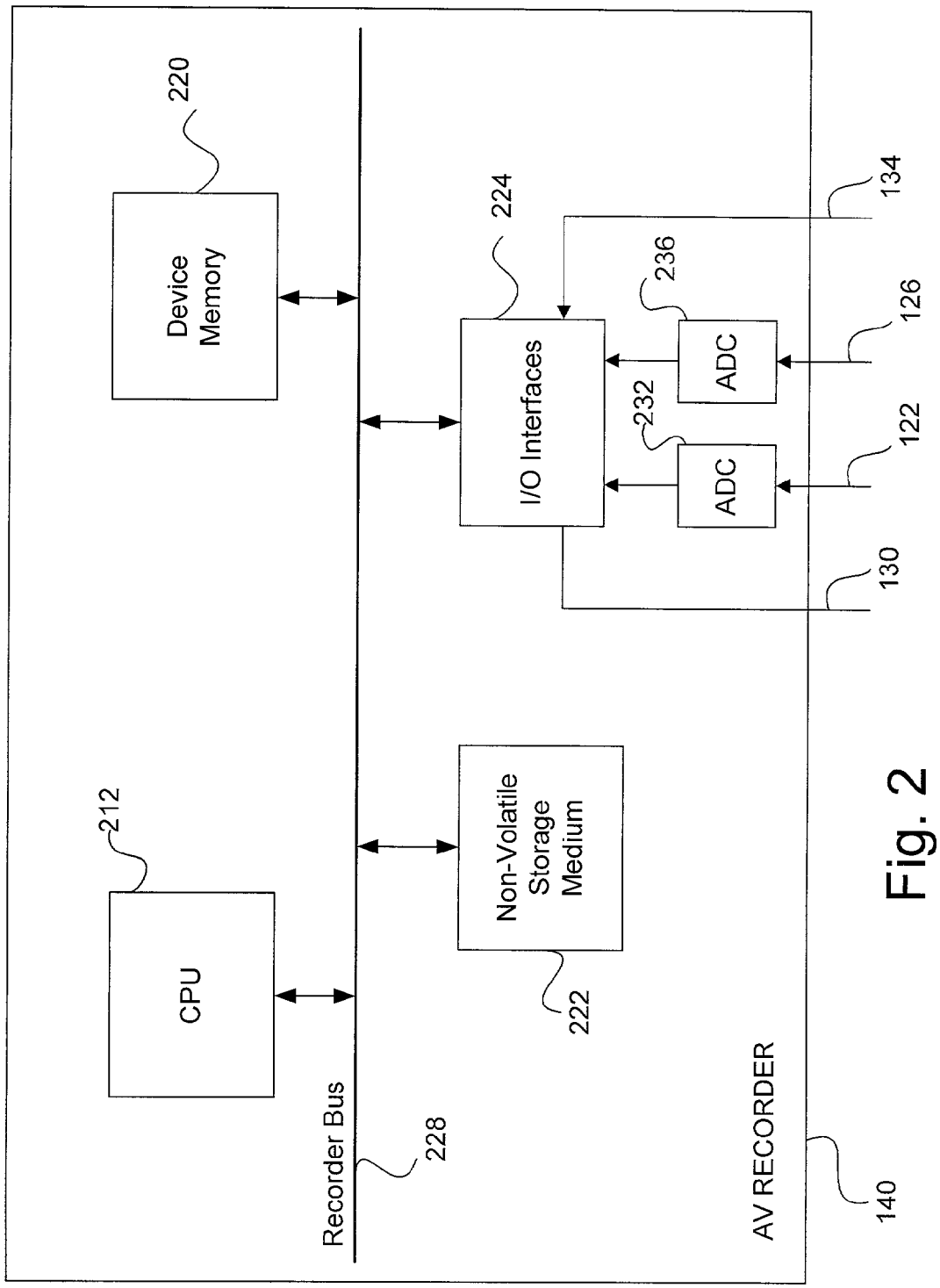
FIG. 2 is a block diagram for one embodiment of the AV recorder of FIG. 1, in accordance with the present invention.

Referring now to FIG. 2, a block diagram for one embodiment of the FIG. 1 AV recorder 140 is shown, in accordance with the present invention. In the FIG. 2 embodiment, AV recorder 140 preferably includes, but is not limited to, a central processing unit (CPU) 212, a device memory 220, a non-volatile storage medium 222, input/output interfaces (I/O interfaces) 224, a video analog-to-digital converter (ADC) 232, and an audio analog-to-digital converter (ADC) 236. Selected ones of the foregoing components of AV recorder 140 may preferably be coupled to, and communicate through, a recorder bus 228.

In alternate embodiments, AV recorder 140 may readily be implemented using various components and configurations in addition to, or instead of, those discussed in conjunction with the FIG. 2 embodiment. In addition, AV recorder 140 may alternately be implemented as any other desired type of electronic system. For example, in certain embodiments, AV recorder 140 may be implemented a computer device or an electronic device that supports wireless electronic communications.

In the FIG. 2 embodiment, CPU 212 may be implemented to include any appropriate and compatible microprocessor device that preferably executes software instructions to thereby control and manage the operation of AV recorder 140. In the FIG. 2 embodiment, device memory 220 may be implemented to include any combination of desired storage devices, including, but not limited to, various types of random-access memory (RAM) devices. The contents and functionality of memory 220 are further discussed below in conjunction with FIGS. 3 and 4.

In the FIG. 2 embodiment, non-volatile storage medium 222 may preferably store various types of electronic information or data for use by AV recorder 140. In the FIG. 2 embodiment, non-volatile storage medium 222 may preferably be implemented to include any type or combination of desired storage devices, including, but not limited to, hard disks, flash memory, floppy disks, tape storage, or optical disk drives. In addition, in certain embodiments, the present invention may be practiced in conjunction with various types of volatile memory devices, instead of, or in addition to, non-volatile storage medium 222.

In the FIG. 2 embodiment, I/O interfaces 224 may preferably include one or more input and/or output interfaces to receive and/or transmit any required types of information for AV recorder 140. For example, in the FIG. 2 embodiment, AV recorder 140 may utilize I/O interfaces 224 to communicate with digital source 120 (FIG. 1) via path 130 and path 134. In addition, I/O interfaces 224 may communicate with analog source 116 (FIG. 1) via path 122 and path 126.

Figure 3:
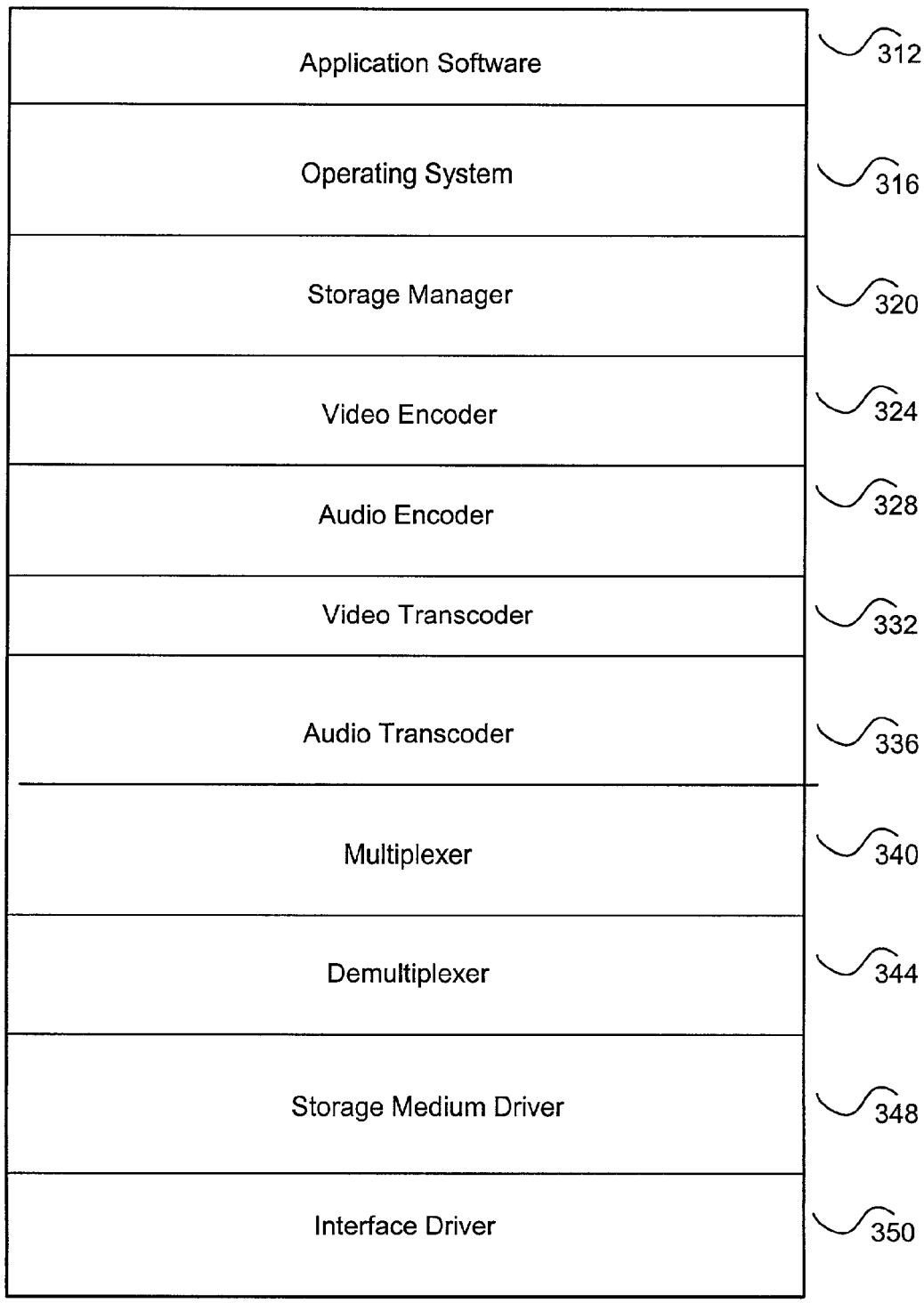
FIG. 3 is a block diagram for one embodiment of the device memory of FIG. 2, in accordance with the present invention.

Referring now to FIG. 3, a block diagram for one embodiment of the FIG. 2 device memory 220 is shown, in accordance with the present invention. In the FIG. 3 embodiment, memory 220 preferably includes, but is not limited to, application software 312, an operating system 316, a storage manager 320, a video encoder 324, an audio encoder 328, a video transcoder 332, an audio transcoder 336, a multiplexer 340, a demultiplexer 344, a storage medium driver 348, and an interface driver 350. In alternate embodiments, memory 220 may readily include various other components in addition to, or instead of, those components discussed in conjunction with the FIG. 3 embodiment.

In the FIG. 3 embodiment, application software 312 may include program instructions that are preferably executed by CPU 212 (FIG. 2) to perform various functions and operations for AV recorder 140. The particular nature and functionality of application software 312 preferably varies depending upon factors such as the specific type and particular functionality of the corresponding AV recorder 140. In the FIG. 3 embodiment, operating system 316 preferably controls and coordinates low-level functionality of AV recorder 140.

In accordance with the present invention, AV recorder 140 may preferably utilize storage manager 320 to advantageously perform storage management procedures to thereby optimize storage usage for AV recorder 140. In alternate embodiments, storage manager 320 may readily be implemented in various types of electronic devices other than AV recorder 140. The implementation and utilization of storage manager 320 is further discussed below in conjunction with FIGS. 4 through 8.

In the FIG. 3 embodiment, video encoder 324, audio encoder 328, video transcoder 332, audio transcoder 336, multiplexer 340, demultiplexer 344, and storage medium driver 348 may preferably be utilized to perform required various functions for AV recorder 140. The operation and respective functionalities of storage manager 320, video encoder 324, audio encoder 328, video transcoder 332, audio transcoder 336, multiplexer 340, demultiplexer 344, storage medium driver 348, and interface driver 350 are further discussed below in conjunction with FIGS. 4 through 8.

In the FIG. 3 embodiment, storage manager 320, video encoder 324, audio encoder 328, video transcoder 332, audio transcoder 336, multiplexer 340, demultiplexer 344, and storage medium driver 348 are disclosed and discussed as being implemented as a group of software modules that are executed by CPU 212 (FIG. 2). However, in alternate embodiments, some or all of the functions of storage manager 320, video encoder 324, audio encoder 328, video transcoder 332, audio transcoder 336, multiplexer 340, demultiplexer 344, and storage medium driver 348 may readily be performed by appropriate electronic hardware circuits that are configured for performing various functions that are equivalent to those functions discussed herein in conjunction with storage manager 320, video encoder 324, audio encoder 328, video transcoder 332, audio transcoder 336, multiplexer 340, demultiplexer 344, and storage medium driver 348.

Figure 4:
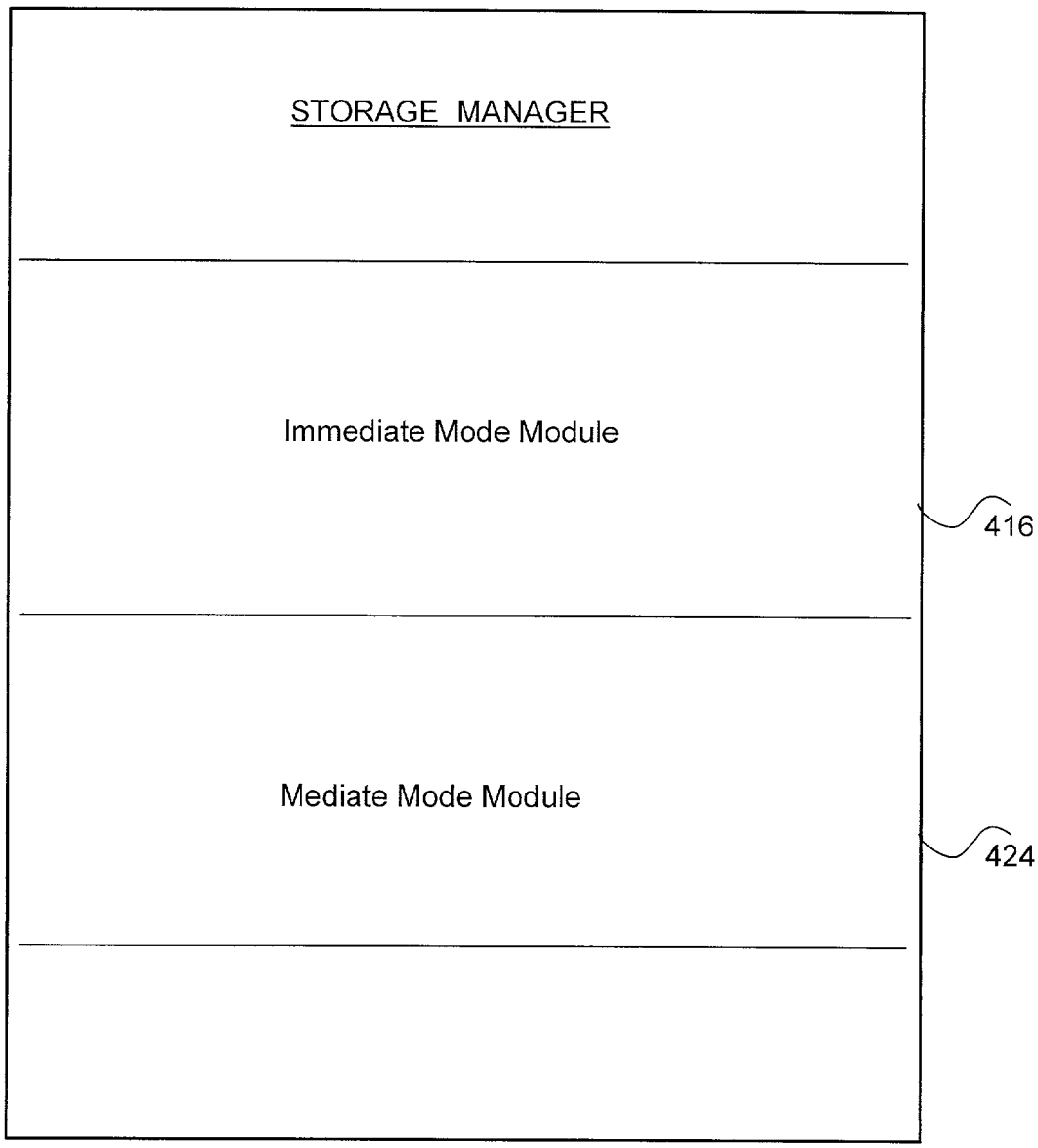
FIG. 4 is a block diagram for one embodiment of the storage manager of FIG. 3, in accordance with the present invention.

Referring now to FIG. 4, a block diagram for one embodiment of the FIG. 3 storage manager 320 is shown, in accordance with the present invention. In the FIG. 4 embodiment, storage manager 320 may include, but is not limited to, an immediate mode module 416 and a mediate mode module 424. In alternate embodiments, storage manager 320 may readily include various other components in addition to, or instead of, those components discussed in conjunction with the FIG. 4 embodiment.

In the FIG. 4 embodiment, immediate mode module 416 may preferably be configured to manage a storage management procedure during an immediate mode. Similarly, mediate mode module 424 may preferably be configured to manage a storage management procedure during a mediate mode. The performance and functionality of the foregoing immediate mode is further discussed below in conjunction with FIG. 7. In addition, the performance and functionality of the foregoing mediate mode is further discussed below in conjunction with FIG. 6.

Figure 5:
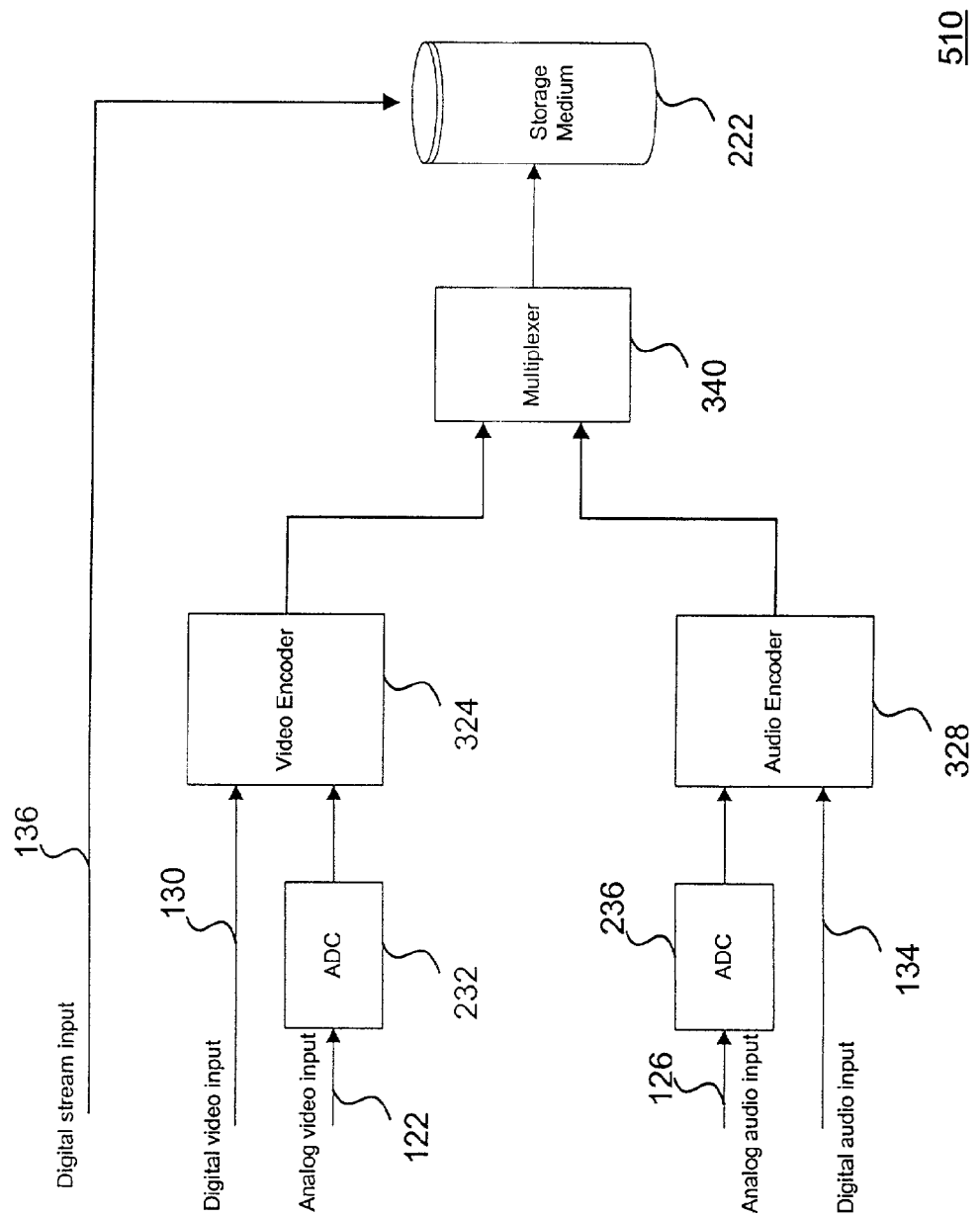
FIG. 5 is a block diagram for illustrating a basic data storage procedure, in accordance with one embodiment of the present invention.

Referring now to FIG. 5, a block diagram 510 illustrating a basic data storage procedure for AV recorder 140 is shown, in accordance with one embodiment of the present invention. In alternate embodiments, the present invention may readily perform data storage procedures by utilizing various components, configurations, and techniques in addition to, or instead of, those discussed in conjunction with the FIG. 5 embodiment.

In the FIG. 5 embodiment, AV recorder 140 may preferably include at least one of a digital video input 130 for receiving a digital video signal, an analog video input 122 for receiving an analog video signal, an analog audio input 126 for receiving an analog audio signal, a digital audio input 134 for receiving a digital audio signal, and a digital stream input 136 for receiving a digital bitstream signal. In the FIG. 5 embodiment, a video encoder 324 (FIG. 3) may preferably receive and encode the foregoing digital video signal to provide an encoded video signal to multiplexer 340. Alternately, a video ADC 232 (FIG. 2) may preferably receive and digitize the foregoing analog video signal to produce a digitized video signal. Video encoder 324 (FIG. 3) may then preferably access and encode the digitized video signal to provide an encoded video signal to multiplexer 340. In certain embodiments in which video signals are previously encoded, video encoder 324 may not be required by AV recorder 140.

In the FIG. 5 embodiment, an audio encoder 328 (FIG. 3) may preferably receive and encode the foregoing digital audio signal to provide an encoded audio signal to multiplexer 340. Alternately, an audio ADC 236 (FIG. 2) may preferably received and digitize the foregoing analog audio signal to produce a digitized audio signal. Audio encoder 328 (FIG. 3) may then preferably access and encode the digitized audio signal to provide an encoded audio signal to multiplexer 340 (FIG. 3). In certain embodiments in which audio signals are previously encoded, audio encoder 328 may not be required by AV recorder 140.

In the FIG. 5 embodiment, multiplexer 340 may preferably multiplex the encoded video signal and the encoded audio signal to produce processed data that may then be stored into a particular storage location in storage medium 222 (FIG. 2). In certain embodiments in which the foregoing encoded video signal and the foregoing encoded audio signal are stored separately in storage medium 222, multiplexer 340 may not be required here by AV recorder 140.

In the FIG. 5 embodiment, AV recorder 140 may utilize a solid-state, non-volatile storage medium 140 to store the processed data. The capacity of storage medium 222 is typically fixed, and storage medium 222 may be built into AV recorder 140. The available recording time for a given storage capacity depends on the bitrate of the recorded signal. As more and more processed data is recorded and stored on storage medium 222, the available storage space becomes smaller and eventually vanishes. Once storage medium 222 has been entirely filled with processed data, AV recorder 140 cannot continue recording or start a new recording session unless it makes storage space available by deleting one or several previous, older recordings from storage medium 222. As a net result, a system user cannot acquire additional information without losing previously recorded information.

Figure 6:
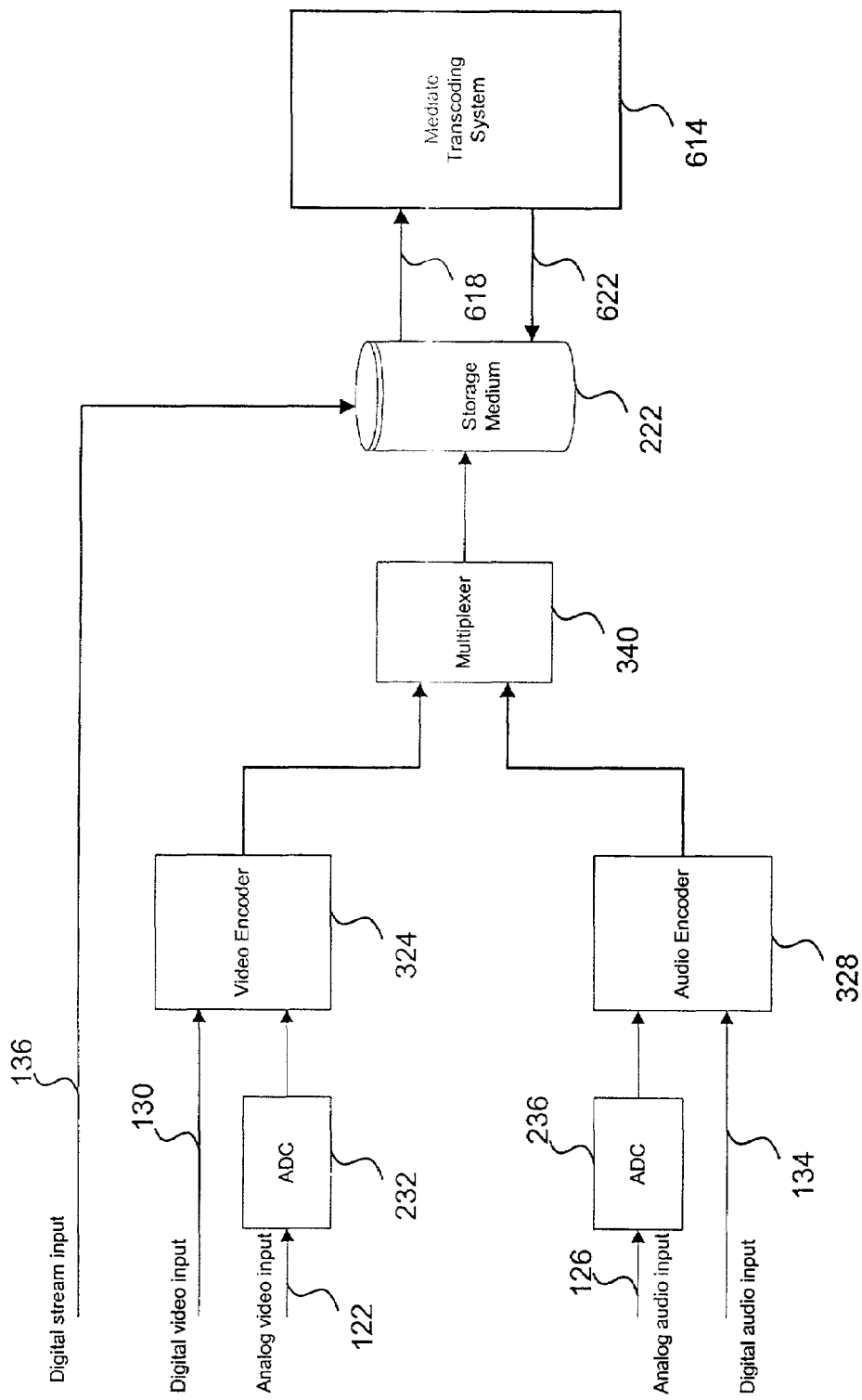
FIG. 6 is a block diagram illustrating a mediate mode, in accordance with one embodiment of the present invention.

Referring now to FIG. 6, a block diagram 610 illustrating a mediate mode for AV recorder 140 is shown, in accordance with one embodiment of the present invention. In alternate embodiments, the mediate mode of the present invention may readily utilize various components, configurations, and techniques in addition to, or instead of, those discussed in conjunction with the FIG. 6 embodiment.

In the FIG. 6 embodiment, AV recorder 140 may preferably include at least one of a digital video input 130 for receiving a digital video signal, an analog video input 122 for receiving an analog video signal, an analog audio input 126 for receiving an analog audio signal, a digital audio input 134 for receiving a digital audio signal, and a digital stream input 136 for receiving a digital bitstream signal. In the FIG. 6 embodiment, a video encoder 324 (FIG. 3) may preferably receive and encode the foregoing digital video signal to provide an encoded video signal to multiplexer 340. Alternately, a video ADC 232 (FIG. 2) may preferably received and digitize the foregoing analog video signal to produce a digitized video signal. Video encoder 324 (FIG. 3) may then preferably access and encode the digitized video signal to provide an encoded video signal to multiplexer 340. In certain embodiments in which video signals are previously encoded, video encoder 324 may not be required by AV recorder 140.

In the FIG. 6 embodiment, an audio encoder 328 (FIG. 3) may preferably receive and encode the foregoing digital audio signal to provide an encoded audio signal to multiplexer 340. Alternately, an audio ADC 236 (FIG. 2) may preferably received and digitize the foregoing analog audio signal to produce a digitized audio signal. Audio encoder 328 may then preferably access and encode the digitized audio signal to provide an encoded audio signal to multiplexer 340 (FIG. 3). In certain embodiments in which audio signals are previously encoded, audio encoder 328 may not be required by AV recorder 140.

In the FIG. 6 embodiment, multiplexer 340 may preferably multiplex the encoded video signal and the encoded audio signal to produce processed data that may then be stored into a particular storage location in storage medium 222 (FIG. 2). In certain embodiments in which the foregoing encoded video signal and the foregoing encoded audio signal are stored separately in storage medium 222, multiplexer 340 may not be required here by AV recorder 140.

In certain embodiments, the present invention may preferably detect situations in which storage space on storage medium 222 becomes scarce. If there is no recording in process, AV recorder 140 may then preferably schedule and activate storage manager 320 to advantageously reformat one or more stored recording items. This reformatting process thus advantageously makes additional storage space on storage medium 222 available to the system user. The foregoing process is referred to herein as the "mediate" mode. The mediate mode provides additional storage space by reformatting specified data into a format that requires less storage space. In most embodiments of the present invention, the foregoing transcoding processes may preferably be performed as background processes in AV recorder 140.

In the mediate mode when AV recorder 140 is not currently recording, the storage capacity originally required by a particular recording item may preferably be reduced by a certain factor. This "storage savings" factor is a function of the original recording bitrate, the original recording format, and the system user's preferences. For example, the system user may prefer to preserve a certain signal quality during various types of reformatting processes.

In the FIG. 6 embodiment, mediate transcoding system 614 may therefore preferably access one or more particular recording items from storage medium via path 618 by utilizing video transcoder 332 and/or audio transcoder 336 (FIG. 3). Mediate transcoding system 614 may preferably be activated and controlled by storage manager (FIG. 3). Mediate transcoding system 614 may then preferably perform a transcoding procedure upon the accessed recording items, and then store the transcoded items back into storage medium 222 via path 622.

In certain embodiments in which encoded video data and encoded audio data are multiplexed together before being stored in storage medium 222, mediate transcoding system 614 may preferably utilize a demultiplexer 344 (FIG. 3) to separate audio data from video data prior to performing respective audio and video transcoding processes. Similarly, mediate transcoding system 614 may preferably utilize a multiplexer 340 (FIG. 3) to combine audio data and video data after performing respective audio and video encoding processes and before storing the combined data back into storage medium 222.

Figure 7:
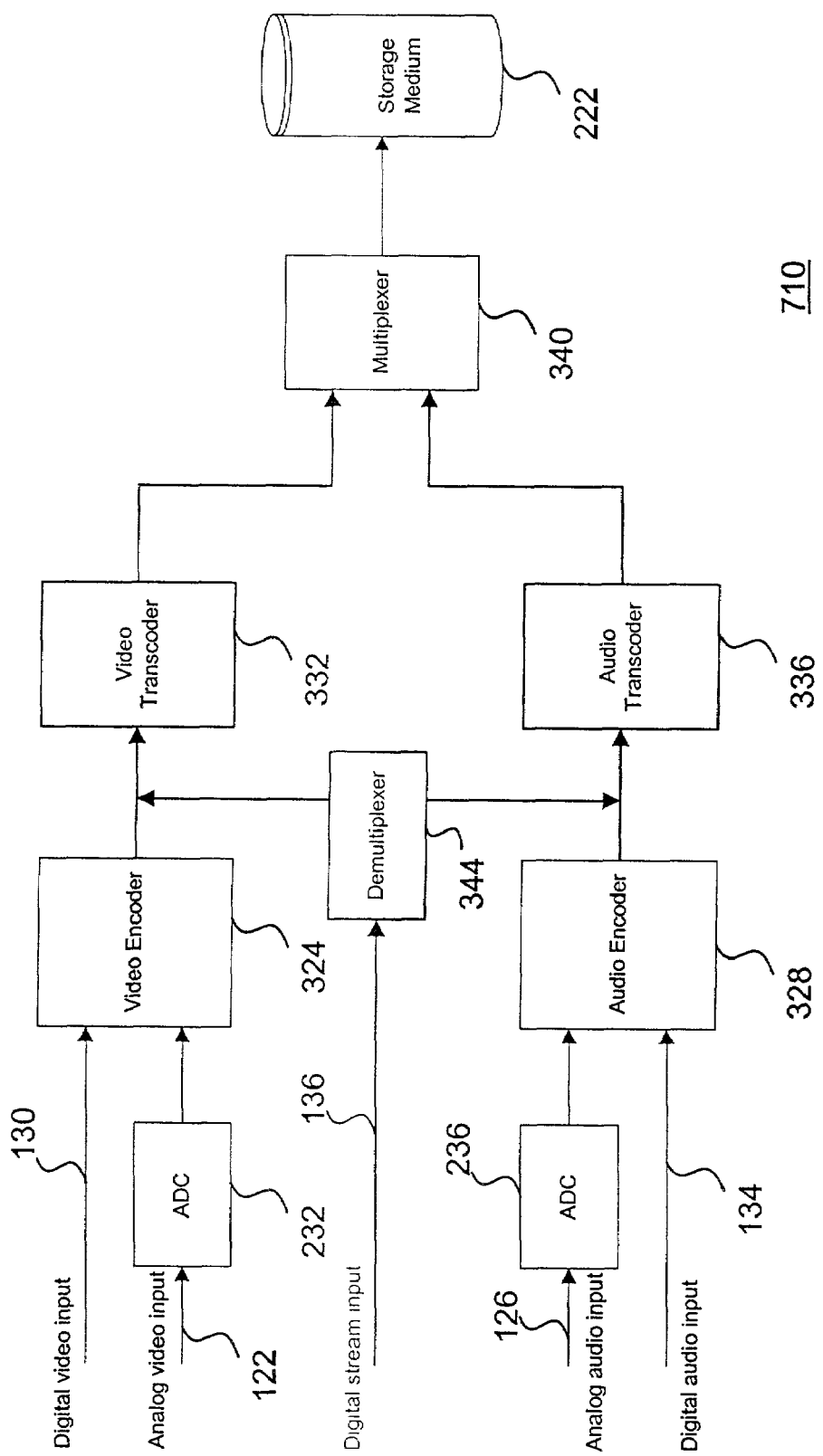
FIG. 7 is a block diagram illustrating an immediate mode, in accordance with one embodiment of the present invention.

Referring now to FIG. 7, a block diagram 710 illustrating an immediate mode for AV recorder 140 is shown, in accordance with one embodiment of the present invention. In alternate embodiments, the immediate mode of the present invention may readily utilize various components, configurations, and techniques in addition to, or instead of, those discussed in conjunction with the FIG. 7 embodiment.

In the FIG. 7 embodiment, AV recorder 140 may currently be receiving new data from any appropriate video source and/or audio source. In situations where available storage space in storage medium 222 has become less than a predetermined threshold amount, AV recorder 140 may then preferably either alter the recording characteristics of the current recording process to conserve storage space on storage medium 222, transcode the incoming data in real time (on-the-fly) as illustrated in the FIG. 7 embodiment, or transcode a previously recorded item (using techniques that are similar to those discussed above in conjunction with mediate mode of FIG. 6) while concurrently recording the incoming data. This process is referred to herein as the "immediate" mode. The immediate mode provides additional storage space by reformatting specified data into a format that requires less storage space. In most embodiments of the present invention, the foregoing processes are preferably performed as background processes in AV recorder 140.

In the FIG. 7 embodiment, AV recorder 140 may preferably include at least one of a digital video input 130 for receiving a digital video signal, an analog video input 122 for receiving an analog video signal, an analog audio input 126 for receiving an analog audio signal, a digital audio input 134 for receiving a digital audio signal, and a digital stream input 136 for receiving a digital bitstream signal. In the FIG. 7 embodiment, a video encoder 324 (FIG. 3) may preferably receive and encode the foregoing digital video signal to provide an encoded video signal to video transcoder 332 (FIG. 3). Alternately, a video ADC 232 (FIG. 2) may preferably received and digitize the foregoing analog video signal to produce a digitized video signal.

Video encoder 324 (FIG. 3) may then preferably access and encode the digitized video signal to provide an encoded video signal to video transcoder 332. In certain embodiments in which video signals are previously encoded, video encoder 324 may not be required by AV recorder 140. In the FIG. 7 embodiment, video transcoder 332 may preferably perform a video transcoding procedure in real time to thereby convert the encoded video signal into a transcoded video signal which requires a smaller amount of storage space in storage medium 222. Video transcoder 332 may then preferably provide the foregoing transcoded video signal to multiplexer 340.

In the FIG. 7 embodiment, an audio encoder 328 (FIG. 3) may preferably receive and encode the foregoing digital audio signal to provide an encoded audio signal to audio transcoder 336 (FIG. 3). Alternately, an audio ADC 236 (FIG. 2) may preferably receive and digitize the foregoing analog audio signal to produce a digitized audio signal.

Audio encoder 328 may then preferably access and encode the digitized audio signal to provide an encoded audio signal to audio transcoder 336 (FIG. 3). In certain embodiments in which audio signals are previously encoded, audio encoder 328 may not be required by AV recorder 140. In the FIG. 7 embodiment, audio transcoder 336 may preferably perform an audio transcoding procedure to convert the encoded audio signal into a transcoded audio signal which requires a smaller amount of storage space in storage medium 222. Audio transcoder 336 may then preferably provide the foregoing transcoded audio signal to multiplexer 340.

In the FIG. 7 embodiment, multiplexer 340 may preferably multiplex the transcoded video signal and the transcoded audio signal to produce processed data that may then be stored into a particular storage location in storage medium 222 (FIG. 2). In certain embodiments in which the foregoing transcoded video signal and the foregoing transcoded audio signal are stored separately in storage medium 222, multiplexer 340 may not be required here by AV recorder 140.

In the immediate mode, the required storage space in storage medium 222 will preferably be less than originally anticipated when the recording characteristics are changed or when the input signal is transcoded on-the-fly. When one or more previously stored items are transcoded while the incoming signal is recorded, AV recorder 140 may preferably create at least as much additional storage space as is required at the given input data rate.

The proposed storage management procedure thus allows a system user to record new data without overwriting previously recorded items. Rather than deleting previous recordings, AV recorder 140 may gracefully degrade these previously recordings. Depending on the original recording mode and depending on the contents of the particular recording, AV recorder 140 in combination with the system user's preferences may advantageously choose a target format for any stored item in storage medium 222.

The following two tables give an overview of typical transcoding processes and indicate selected examples of the storage savings achieved hereby. The input signals of AV recorder 140 may preferably include audio data only, video data only, or audio and video data together. In certain embodiments, input formats for video signals may preferably include, but are not limited to, D1, DV, MPEG2, and MPEG4 formats.

Video Input Table

| Input format | Input bitrate | Required storage space @ input bitrate for 1 hour recording | Transcoded output format | Transcoded output bitrate | Required storage space @ transcoder output bitrate for 1 hour recording |
|---|---|---|---|---|---|
| VIDEO INPUT TABLE: | | | | | |
| D1 | 165.9 Mbps | 746.6 GByte | MPEG2 Video ES MP@ML | 12 Mbps | 5.4 GBytes |
| DV HD | 57.6 Mbps | 25.9 GBytes | DV SD | 25.7 Mbps | 11.6 GBytes |
| DV SD | 25.7 Mbps | 11.6 GBytes | MPEG2 Video ES MP@ML | 6 Mbps | 2.7 GBytes |
| MPEG2 Video ES MP@ML | 8 Mbps | 3.6 GBytes | MPEG2 Video ES MP@ML | 4 Mbps | 1.8 GBytes |
| MPEG2 Video ES MP@HL | 18 Mbps | 8.1 GBytes | MPEG2 Video ES MP@ML | 6 Mbps | 2.7 GBytes |
| MPEG2 Video ES | 4 Mbps | 1.8 GBytes | MPEG4 Video ES | 1 Mbps | 0.45 GBytes |
| MPEG4 Video ES | 2 Mbps | 0.9 GBytes | MPEG4 Video ES | 768 kbps | 0.35 Gbytes |

In certain embodiments of the present invention, formats for audio data may preferably include, but are not limited to, AAC, AC3, MPEG1-Layer II, MPEG1-Layer III (MP3) formats.

Audio Input Table

| Input format | Input bitrate | Required storage space @ input bitrate | Transcoded output format | Recording bitrate | Required storage space @ transcoder output bitrate for 1 hour recording |
|---|---|---|---|---|---|
| AUDIO INPUT TABLE: | | | | | |
| PCM | 1.4 Mbps | 630 MBytes | AAC | 128 kbps | 57.6 MBytes |
| AAC | 384 kbps | 173 MBytes | AAC | 64 kbps | 28.8 MBytes |
| AC3 | 512 kbps | 230 MBytes | AAC | 64 kbps | 28.8 MBytes |
| MPEG1-Layer | 448 kbps | 202 MBytes | MPEG1-Layer III | 128 kbps | 57.6 MBytes |
| MPEG1-Layer III | 384 kbps | 173 MBytes | MPEG1-Layer III | 128 kbps | 57.6 MBytes |

Figure 8:
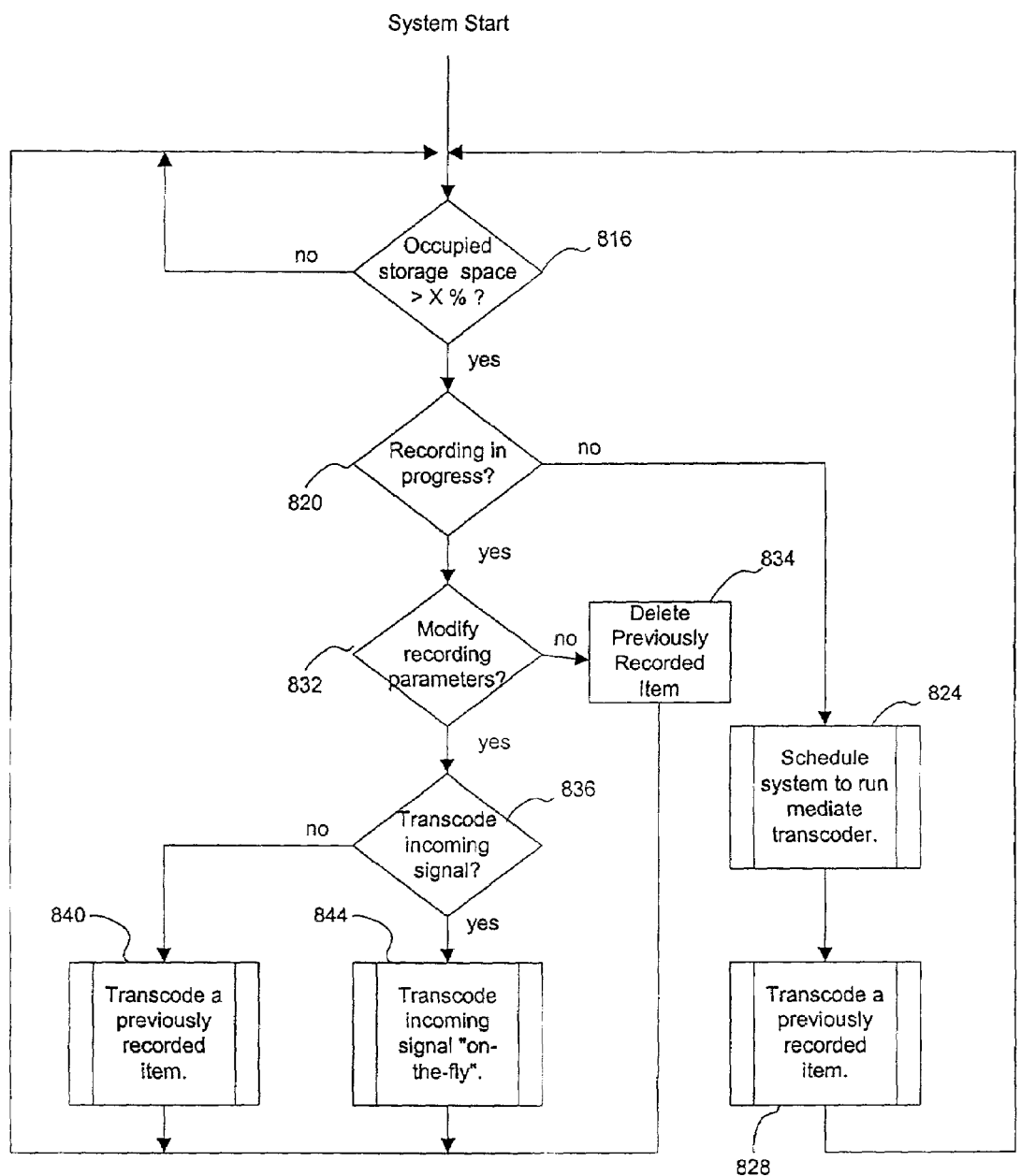
FIG. 8 is a flowchart of method steps for efficiently performing a storage management procedure, in accordance with one embodiment of the present invention.

Referring now to FIG. 8, a flowchart of method steps for efficiently performing a storage management procedure is shown, in accordance with one embodiment of the present invention. The FIG. 8 example is presented for purposes of illustration, and in alternate embodiments, the present invention may readily utilize various other steps and sequences than those discussed in conjunction with the FIG. 8 embodiment.

In the FIG. 8 embodiment, initially, in step 816, a storage manager 320 of AV recorder 140 may preferably determine whether occupied storage space in storage medium 222 is greater than a predetermined threshold value (represented as X % in FIG. 8). In the FIG. 8 embodiment, a system user may preferably select one or more specific threshold values for triggering either a mediate mode or an immediate mode, as discussed above in conjunction with FIGS. 6 and 7. In certain embodiments, storage manager 320 may preferably receive current storage capacity information from a storage medium driver 348 (FIG. 3) that services storage medium 222.

If storage manager 320 determines that occupied storage space in storage medium 222 exceeds the specified threshold value, then in step 820, storage manager 320 may preferably determine whether a recording of processed data into storage medium 222 is currently in progress in AV recorder 140. If no recording is currently in progress, then in step 824, storage manager 320 may preferably schedule AV recorder 140 to enter the mediate mode, as discussed above in conjunction with FIG. 6. AV recorder 140 may then responsively utilize mediate transcoding system 614 (FIG. 6) to transcode one or more previously recorded items from storage medium 222.

In the FIG. 8 embodiment, storage manager 320 may preferably select stored items for transcoding by utilizing any appropriate techniques. For example, a system user may prioritize the stored information by item type or item characteristics to thereby establish an appropriate order for transcoding. Alternately, stored items may be transcoded in chronological order in which, for example, the oldest stored items are transcoded first. The FIG. 8 process may preferably then return to step 816 to continue monitoring storage medium 222.

However, in foregoing step 820, if a recording is currently in progress, then in step 832, storage manager 320 may preferably determine whether to modify current recording parameters for AV recorder 140 by utilizing any appropriate techniques. For example, storage manager 320 may reference locally-stored user preferences or system settings to determine whether to modify current recording parameters for AV recorder 140. If storage manager 320 determines not to modify current recording parameters for AV recorder 140, then in step 834, storage manger 320 may preferably delete a previously recorded item from storage medium 222, and the FIG. 8 process may preferably return to foregoing step 816.

However, in foregoing step 832, if storage manager 320 determines to modify current recording parameters, then in step 836, storage manager 320 may preferably determine whether to transcode the incoming signal(s) by utilizing any appropriate techniques. For example, storage manager 320 may reference locally-stored user preferences or system settings to determine whether to transcode the incoming signal(s). If storage manager 320 determines not to transcode the incoming signal(s), then in step 840, storage manager 320 may preferably transcode a previously recorded item on storage medium 222 using a parallel transcoding technique. The FIG. 8 process may preferably then return to step 816 to monitor the current storage level of storage medium 222.

In foregoing step 836, if storage manager 320 determines to transcode the incoming signal(s), then in step 844, storage manager 320 may preferably transcode the incoming signal(s) "on-the-fly" using a real-time transcoding technique as discussed above in conjunction with FIG. 7. The FIG. 8 process may then preferably return to step 816 to monitor the current storage level of storage medium 222.

The present invention may preferably provide optimized performance with a storage manager 320 that meets real-time requirements of a given system, such as AV recorder 140. Then, the immediate mode and the mediate mode are both available to the system user. However, if the AV recorder 140 does not support real-time processing, the mediate mode may still be effective. In this sense, storage manager 320 is scalable with the performance of the AV recorder 140.

The present invention may preferably be implemented in either software or in hardware environments. In addition, the present invention may easily be added to existing software-based solutions. The present invention may preferably be utilized in any system embedding a solid-state, non-volatile storage medium 222. The mediate mode may further be implemented in various types of tape-drive equipped systems.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing a storage management procedure, comprising:
    an electronic device configured to receive information from an information source, said electronic device responsively storing said information into a storage medium; and
    a storage manager configured to control said storage management procedure by selectively activating a data transcoding procedure that transcodes specified segments of said information to thereby increase available storage space in said storage medium, said data transcoding procedure being triggered by said storage manager to begin whenever said available storage space in said storage medium is less than at least one predetermined storage-space threshold value, said data transcoding procedure including an immediate mode during which said transcoding procedure occurs while said information is initially being procedure further including a mediate mode during which said transcoding procedure occurs when said information is not currently being received by said electronic device.

2. The system of claim 1 wherein said storage medium is implemented to include at least one of a non-volatile storage medium, a hard-disk drive device, a tape storage device, and an optical disk drive.

3. The system of claim 1 wherein said electronic device is implemented as an audio-video recorder device that stores said information into said storage medium.

4. The system of claim 3 wherein said audio-video recorder device is implemented to receive and process any of a digital video signal, a digital audio signal, an analog video signal, an analog audio signal, and digital steam data.

5. The system of claim 3 wherein said audio-video recorder device is implemented to include a central processing unit, said storage medium, one or more analog-to-digital converters, a plurality of input/output interfaces, and a device memory.

6. The system of claim 5 wherein said device memory includes application software, an operating system, said storage manager, a video encoder, an audio encoder, a video transcoder, an audio transcoder, a multiplexer, a demultiplexer, a storage medium driver, and an interface driver.

7. The system of claim 1 wherein said immediate mode utilizes an audio transcoder to transcode audio input data into a more compact audio format before storing said audio input data into said storage medium, said immediate mode similarly utilizing a video transcoder to transcode video input data into a more compact video format before storing said video input data into said storage medium.

8. The system of claim 1 wherein said storage manager alternately chooses any of a recording parameter alteration technique, a real-time input data transcoding technique, and a previously-stored data transcoding technique to perform said immediate mode of said storage management procedure.

9. The system of claim 1 wherein said storage manager performs said mediate mode of said storage management procedure by scheduling a mediate transcoding system to access and transcode one or more specified stored items from said storage medium as part of a background process in said electronic device, said electronic device responsively turning itself on at an arbitrary time when a system user is unlikely to be utilizing said electronic device, said electronic device then transcoding said one or more specified stored items and turning itself off when finished.

10. The system of claim 1 wherein said mediate mode utilizes a demultiplexer to separate stored information into stored audio data and stored video data, said mediate mode then using an audio transcoder to transcode said stored audio data into a more compact audio format, said mediate mode similarly utilizing a video transcoder to transcode said stored video data into a more compact video format, said mediate mode then using a multiplexer to recombine said stored audio data and said stored video data into said stored information which may then be rewritten back into said storage medium in a more compact storage space.

11. The system of claim 1 wherein said storage manager determines whether said available storage space in said storage medium is less than said received by said electronic device, said data transcoding at least one predetermined storage-space threshold value that is selectable by a system user.

12. The system of claim 11 wherein a storage medium driver provides current storage capacity information regarding said storage medium to said storage manager for determining whether said available storage space in said storage medium is less than said at least one predetermined storage-space threshold value.

13. The system of claim 11 wherein said storage manager determines whether a data recording process is currently occurring in said electronic device whenever said available storage space in said storage medium is less than said at least one predetermined storage-space threshold value.

14. The system of claim 13 wherein said storage manager initiates said mediate mode when said data recording process is not currently occurring in said electronic device, and said available storage space in said storage medium is less than said at least one predetermined storage-space threshold value, said storage manager then scheduling said electronic device to perform said data transcoding procedure on said information from said storage medium.

15. The system of claim 14 wherein a mediate transcoding system coupled to said electronic device performs said transcoding procedure on said specified segments of said information from said storage medium, said storage manager identifying said specified segments for said transcoding procedure in accordance with system-user preference selections that establish a transcoding selection priority that is alternately based upon any of a data-type hierarchy system and a data-recording chronology system, said data-type hierarchy system ranking said specified segments according to selected data characteristics, said data-recording chronology system ranking said specified segments from an oldest recording to a newest recording according to respective recording dates and recording times.

16. The system of claim 13 wherein said storage manager determines whether to modify current recording parameters in said immediate mode when said data recording process is currently occurring in said electronic device, and said available storage space in said storage medium is less than said at least one predetermined storage-space threshold value.

17. The system of claim 16 wherein said storage manager initiates said immediate mode in accordance with a system-user selection when said data recording process is currently occurring in said electronic device, and said available storage space in said storage medium is less than said at least one predetermined storage-space threshold value, said storage manager then referencing a system-user preference to determine whether to operate said immediate mode alternately using any of a real-time transcoding technique and a parallel transcoding technique.

18. The system of claim 17 wherein said storage manager operates said immediate mode using said real-time transcoding technique in which input data that is currently being received by said electronic device is transcoded before being stored into said storage medium.

19. The system of claim 17 wherein said storage manager operates said immediate mode using said parallel transcoding technique in which said information that has already been stored into said storage medium is transcoded in a background process, while input data that is currently being received by said electronic device is stored into said storage medium.

20. The system of claim 1 wherein any portions of said storage management procedure are implemented by utilizing electronic hardware circuitry that is coupled to said electronic device.

21. A method for performing a storage management procedure, comprising the steps of:
receiving information from an information source by utilizing an electronic device that responsively stores said information into a storage medium; and
controlling said storage management procedure with a storage manager that selectively activates a data transcoding procedure that transcodes specified segments of said information to thereby increase available storage space in said storage medium, said data transcoding procedure being triggered by said storage manager to begin whenever said available storage space in said storage medium is less than at least one predetermined storage-space threshold value, said data transcoding procedure including an immediate mode during which said transcoding procedure occurs while said information is initially being received by said electronic device, said data transcoding procedure further including a mediate mode during which said transcoding procedure occurs when said information is not currently being received by said electronic device.

22. The method of claim 21 wherein said storage medium is implemented to include at least one of a non-volatile storage medium, a hard-disk drive device, a tape storage device, and an optical disk drive.

23. The method of claim 21 wherein said electronic device is implemented as an audio-video recorder device that stores said information into said storage medium.

24. The method of claim 23 wherein said audio-video recorder device is implemented to receive and process any of a digital video signal, a digital audio signal, an analog video signal, an analog audio signal, and digital stream data.

25. The method of claim 23 wherein said audio-video recorder device is implemented to include a central processing unit, said storage medium, one or more analog-to-digital converters, a plurality of input/output interfaces, and a device memory.

26. The method of claim 25 wherein said device memory includes application software, an operating system, said storage manager, a video encoder, an audio encoder, a video transcoder, an audio transcoder, a multiplexer, a demultiplexer, a storage medium driver, and an interface driver.

27. The method of claim 21 wherein said immediate mode utilizes an audio transcoder to transcode audio input data into a more compact audio format before storing said audio input data into said storage medium, said immediate mode similarly utilizing a video transcoder to transcode video input data into a more compact video format before storing said video input data into said storage medium.

28. The method of claim 21 wherein said storage manager alternately chooses any of a recording parameter alteration technique, a real-time input data transcoding technique, and a previously-stored data transcoding technique to perform said immediate mode of said storage management procedure.

29. The method of claim 21 wherein said storage manager performs said mediate mode of said storage management procedure by scheduling a mediate transcoding system to access and transcode one or more specified stored items from said storage medium as part of a background process in said electronic device, said electronic device responsively turning itself on at an arbitrary time when a system user is unlikely to be utilizing said electronic device, said electronic device then transcoding said one or more specified stored items and turning itself off when finished.

30. The method of claim 21 wherein said mediate mode utilizes a demultiplexer to separate stored information into stored audio data and stored video data, said mediate mode then using an audio transcoder to transcode said stored audio data into a more compact audio format, said mediate mode similarly utilizing a video transcoder to transcode said stored video data into a more compact video format, said mediate mode then using a multiplexer to recombine said stored audio data and said stored video data into said stored information which may then be rewritten back into said storage medium in a more compact storage space.

31. The method of claim 21 wherein said storage manager determines whether said available storage space in said storage medium is less than at said least one predetermined storage-space threshold value that is selectable by a system user.

32. The method of claim 31 wherein a storage medium driver provides current storage capacity information regarding said storage medium to said storage manager for determining whether said available storage space in said storage medium is less than said at least one predetermined storage-space threshold value.

33. The method of claim 31 wherein said storage manager determines whether a data recording process is currently occurring in said electronic device whenever said available storage space in said storage medium is less than said at least one predetermined storage-space threshold value.

34. The method of claim 33 wherein said storage manager initiates said mediate mode when said data recording process is not currently occurring in said electronic device, and said available storage space in said storage medium is less than said at least one predetermined storage-space threshold value, said storage manager then scheduling said electronic device to perform said data transcoding procedure on said information from said storage medium.

35. The method of claim 34 wherein a mediate transcoding system coupled to said electronic device performs said transcoding procedure on said specified segments of said information from said storage medium, said storage manager identifying said specified segments for said transcoding procedure in accordance with system-user preference selections that establish a transcoding selection priority that is alternately based upon any of a data-type hierarchy system and a data-recording chronology system, said data-type hierarchy system ranking said specified segments according to selected data characteristics, said data-recording chronology system ranking said specified segments from an oldest recording to a newest recording according to respective recording dates and recording times.

36. The method of claim 33 wherein said storage manager determines whether to modify current recording parameters in said immediate mode when said data recording process is currently occurring in said electronic device, and said available storage space in said storage medium is less than said at least one predetermined storage-space threshold value.

37. The method of claim 36 wherein said storage manager initiates said immediate mode in accordance with a system-user selection when said data recording process is currently occurring in said electronic device, and said available storage space in said storage medium is less than said at least one predetermined storage-space threshold value, said storage manager then referencing a system-user preference to determine whether to operate said immediate mode alternately using any of a real-time transcoding technique and a parallel transcoding technique.

38. The method of claim 37 wherein said storage manager operates said immediate mode using said real-time transcoding technique in which input data that is currently being received by said electronic device is transcoded before being stored into said storage medium.

39. The method of claim 37 wherein said storage manager operates said immediate mode using said parallel transcoding technique in which said information that has already been stored into said storage medium is transcoded in a background process, while input data that is currently being received by said electronic device is stored into said storage medium.

40. The method of claim 21 wherein any portions of said storage management procedure are implemented by utilizing electronic hardware circuitry that is coupled to said electronic device.

41. A computer-readable medium comprising program instructions for performing a storage management procedure by performing the steps of:
receiving information from an information source by utilizing an electronic device that responsively stores said information into a storage medium; and
controlling said storage management procedure with a storage manager that selectively activates a data transcoding procedure that transcodes specified segments of said information to thereby increase available storage space in said storage medium, said data transcoding procedure being triggered by said storage manager to begin whenever said available storage space in said storage medium is less than at least one predetermined storage-space threshold value, said data transcoding procedure including an immediate mode during which said transcoding procedure occurs while said information is initially being received by said electronic device, said data transcoding procedure further including a mediate mode during which said transcoding procedure occurs when said information is not currently being received by said electronic device.

42. A system for performing a storage management procedure, comprising:
means for receiving information from an information source and responsively storing said information into a storage medium; and
means for controlling said storage management procedure by activating a data transcoding procedure that transcodes specified segments of said information to thereby increase available storage space in said storage medium, said data transcoding procedure including an immediate mode during which said transcoding procedure occurs while said information is initially being received by said electronic device, said data transcoding procedure further including a mediate mode during which said transcoding procedure occurs when said information is not currently being received by said electronic device.

43. A system for performing a storage management procedure, comprising:

an electronic device configured to receive information from an information source, said electronic device responsively storing said information into a storage medium; and a storage manager configured to control said storage management procedure by selectively activating a data transcoding procedure that transcodes specified segments of said information to thereby increase available storage space in said storage medium, said data transcoding procedure being triggered by said storage manager to begin whenever said available storage space in said storage medium is less than at least one predetermined storage-space threshold value.

* * * * *